United States Patent
Xu et al.

(10) Patent No.: US 11,749,255 B2
(45) Date of Patent: Sep. 5, 2023

(54) VOICE QUESTION AND ANSWER METHOD AND DEVICE, COMPUTER READABLE STORAGE MEDIUM AND ELECTRONIC DEVICE

(71) Applicant: BOE TECHNOLOGY GROUP CO., LTD., Beijing (CN)

(72) Inventors: Chu Xu, Beijing (CN); Shuo Chen, Beijing (CN); Xingqun Jiang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 357 days.

(21) Appl. No.: 17/254,429

(22) PCT Filed: Mar. 31, 2020

(86) PCT No.: PCT/CN2020/082603
§ 371 (c)(1),
(2) Date: Dec. 21, 2020

(87) PCT Pub. No.: WO2020/220914
PCT Pub. Date: Nov. 5, 2020

(65) Prior Publication Data
US 2021/0125600 A1    Apr. 29, 2021

(30) Foreign Application Priority Data

Apr. 30, 2019 (CN) .......................... 201910365034.3

(51) Int. Cl.
*G10L 13/04*   (2013.01)
*G06F 40/205*  (2020.01)
(Continued)

(52) U.S. Cl.
CPC ............ *G10L 13/04* (2013.01); *G06F 40/205* (2020.01); *G06F 40/30* (2020.01); *G10L 15/26* (2013.01)

(58) Field of Classification Search
CPC ..... G10L 13/04; G10L 15/26; G06F 16/3329; G06F 16/3344; G06F 16/90332; G06F 40/205; G06F 40/30
See application file for complete search history.

(56) References Cited

U.S. PATENT DOCUMENTS

| | | |
|---|---|---|
| 6,615,172 B1 | 9/2003 | Bennett |
| 7,502,738 B2 * | 3/2009 | Kennewick ......... G10L 15/1822 704/275 |

(Continued)

FOREIGN PATENT DOCUMENTS

| | | |
|---|---|---|
| CN | 106326307 A | 1/2017 |
| CN | 107193973 A | 9/2017 |

(Continued)

OTHER PUBLICATIONS

Written Opinion of the International Searching Authority for PCT/CN2020/082603 dated Jul. 2, 2020.

(Continued)

*Primary Examiner* — Eric Yen
(74) *Attorney, Agent, or Firm* — Perilla Knox & Hildebrandt LLP; Kenneth A. Knox

(57) ABSTRACT

A voice question and answer method and device, a computer readable storage medium, and an electronic device are described. The method comprises: receiving question voice information, and obtaining question text information according to the question voice information; performing at least one of general semantic analysis processing and dedicated semantic analysis processing on the question text information to generate an analysis result; and obtaining answer information according to the analysis result. The general (Continued)

semantic analysis is used for semantic analysis in the general field, and the dedicated semantic analysis is used for semantic analysis in the art field.

17 Claims, 9 Drawing Sheets

(51) Int. Cl.
   *G06F 40/30* (2020.01)
   *G10L 15/26* (2006.01)

(56) References Cited

U.S. PATENT DOCUMENTS

| | | | |
|---|---|---|---|
| 9,026,431 | B1* | 5/2015 | Moreno Mengibar ..................... G10L 15/1822 704/250 |
| 10,332,508 | B1* | 6/2019 | Hoffmeister ............. G06N 3/08 |
| 2004/0034525 | A1* | 2/2004 | Pentheroudakis .... G06F 40/242 704/9 |
| 2004/0249796 | A1* | 12/2004 | Azzam .............. G06F 16/24575 |
| 2007/0067293 | A1* | 3/2007 | Yu ....................... G06F 16/3346 |
| 2007/0294614 | A1* | 12/2007 | Jacquin ................. G06F 40/169 707/E17.093 |
| 2010/0312782 | A1* | 12/2010 | Li ....................... G06F 16/9038 707/753 |
| 2013/0031113 | A1* | 1/2013 | Feng ..................... G06F 16/243 707/E17.014 |
| 2014/0279864 | A1* | 9/2014 | Lopyrev ............... G06F 16/258 707/755 |
| 2014/0365502 | A1* | 12/2014 | Haggar ................... G06N 5/02 707/748 |
| 2016/0179783 | A1* | 6/2016 | Boguraev ........... G06F 16/3329 704/9 |
| 2016/0188573 | A1* | 6/2016 | Tang ..................... G06F 40/284 704/9 |
| 2017/0024375 | A1* | 1/2017 | Hakkani-Tur ........ G06F 16/337 |
| 2017/0364310 | A1* | 12/2017 | Endo ....................... G06F 3/167 |
| 2018/0018676 | A1* | 1/2018 | Mukherjee ............. G06Q 10/10 |
| 2018/0189385 | A1* | 7/2018 | Sun ........................ G06F 16/243 |
| 2018/0232662 | A1* | 8/2018 | Solomon ................ G06N 20/00 |
| 2018/0342241 | A1 | 11/2018 | Qu |
| 2018/0373965 | A1* | 12/2018 | He .......................... G10L 15/08 |
| 2018/0374474 | A1* | 12/2018 | Wang .................. G10L 15/1815 |
| 2019/0057076 | A1* | 2/2019 | Boguraev .............. G06F 40/30 |
| 2019/0220668 | A1* | 7/2019 | Siskind ................ G06V 10/761 |
| 2021/0117625 | A1* | 4/2021 | Gao ................. G06N 5/02 |
| 2021/0319344 | A1* | 10/2021 | Tang ...................... G06N 3/08 |
| 2022/0115008 | A1* | 4/2022 | Pust ........................ G10L 15/16 |
| 2022/0138432 | A1* | 5/2022 | Galitsky ............. G06F 16/3329 704/9 |

FOREIGN PATENT DOCUMENTS

| | | |
|---|---|---|
| CN | 108320745 A | 7/2018 |
| CN | 109271498 A | 1/2019 |
| TW | 201701270 A | 1/2017 |
| TW | 588816 B | 6/2017 |
| WO | 2017000809 A1 | 1/2017 |

OTHER PUBLICATIONS

International Search Report for PCT/CN2020/082603 dated Jul. 2, 2020.

* cited by examiner

VOICE QUESTION AND ANSWER METHOD AND DEVICE, COMPUTER READABLE STORAGE MEDIUM AND ELECTRONIC DEVICE

CROSS-REFERENCE TO RELATED APPLICATIONS

The present application is a national phase application under 35 U.S.C. § 371 of International Application No. PCT/CN2020/082603 filed Mar. 31, 2020, which claims the benefit of and priority to Chinese Patent Application No. 201910365034.3, entitled "VOICE QUESTION-ANSWERING METHOD AND APPARATUS, COMPUTER READABLE STORAGE MEDIUM AND ELECTRONIC DEVICE" filed Apr. 30, 2019, the entire contents of which are hereby incorporated by reference.

TECHNICAL FIELD

The present disclosure relates to the field of computer technologies, and in particular to a voice question-answering method and apparatus, computer readable storage medium and an electronic device.

BACKGROUND

Electronic photo frames can show users a variety of painting masterpieces and new artistic products, so that artworks can enter homes and office space in a digital form. The users have a demand for voice question-answering achieved on the electronic photo frames.

It should be noted that the information disclosed in the Background section above is only for enhancing the understanding of the background of the present disclosure, and thus may include information that does not constitute prior art known to those of ordinary skill in the art

SUMMARY

An objective of the present disclosure is to provide a voice question-answering method and apparatus, computer readable storage medium and an electronic device.

According to a first aspect of the present disclosure, there is provided a voice question-answering method, and the method includes: receiving question voice information, and obtaining question text information according to the question voice information; performing at least one of general semantic parsing processing and dedicated semantic parsing processing on the question text information to generate a parsing result; and obtaining answer information according to the parsing result, wherein the general semantic parsing is used for semantic parsing in a general field, and the dedicated semantic parsing is used for semantic parsing in an art field.

According to an embodiment of the present disclosure, the step of performing at least one of general semantic parsing processing and dedicated semantic parsing processing on the question text information to generate a parsing result includes: performing the general semantic parsing processing on the question text information to generate a first parsing result in response to the question text information, and performing the dedicated semantic parsing processing on the question text information to generate a second parsing result in response to the question text information; and obtaining the parsing result according to the first parsing result and the second parsing result.

According to an embodiment of the present disclosure, the step of performing at least one of general semantic parsing processing and dedicated semantic parsing processing on the question text information to generate a parsing result includes: obtaining a question field according to the question text information; selecting to perform the general semantic parsing processing or the dedicated semantic parsing processing on the question text information according to the question field; and generating the parsing result in response to the question text information.

According to an embodiment of the present disclosure, the step of obtaining the parsing result according to the first parsing result and the second parsing result includes: determining the parsing result according to a time sequence of obtaining the first parsing result and the second parsing result, if the second parsing result is not a predetermined identifier.

According to an embodiment of the present disclosure, the step of obtaining answer information according to the parsing result includes: taking the second parsing result as the parsing result if the second parsing result is obtained first; and retrieving the answer information for the question voice information according to the second parsing result and current work information.

According to an embodiment of the present disclosure, the step of obtaining answer information according to the parsing result includes: taking the first parsing result as the parsing result if the first parsing result is obtained first; and using the first parsing result as the answer information.

According to an embodiment of the present disclosure, the method further includes adjusting display content according to the answer information.

According to an embodiment of the present disclosure, the step of adjusting display content according to the answer information includes: matching the answer information with art painting information of current display content to obtain a matching result; and adjusting the display content as art painting content corresponding to the answer information, if the matching result is that the answer information is inconsistent with the art painting information of the current display content.

According to an embodiment of the present disclosure, the step of obtaining the parsing result according to the first parsing result and the second parsing result includes: taking the first parsing result as the parsing result, if the second parsing result is the predetermined identifier.

According to a second aspect of the present disclosure, there is provided a voice question-answering apparatus, and the apparatus includes: a question text obtaining module, configured to receive question voice information and obtain question text information according to the question voice information; a parsing result generating module, configured to perform at least one of general semantic parsing processing and dedicated semantic parsing processing on the question text information to generate a parsing result; and an answer information obtaining module, configured to obtain answer information according to the parsing result, wherein the general semantic parsing is used for semantic parsing in a general field, and the dedicated semantic parsing is used for semantic parsing in an art field.

According to an embodiment of the present disclosure, the parsing result generating module includes: a semantic parsing unit configured to perform the general semantic parsing processing and the dedicated semantic parsing processing on the question text information respectively; a semantic obtaining unit, configured to generate a first parsing result and a second parsing result in response to the question text information respectively; and a parsing result obtaining unit, configured to obtain the parsing result according to the first parsing result and the second parsing result.

According to an embodiment of the present disclosure, the parsing result generating module includes: a question field obtaining unit, configured to obtain a question field according to the question text information; a semantic parsing selecting unit configured to select to perform the general semantic parsing processing or the dedicated semantic parsing processing on the question text information according to the question field; and a parsing result generating unit, configured to generate the parsing result in response to the question text information.

According to an embodiment of the present disclosure, the parsing result obtaining unit is configured to: determine the parsing result according to a time sequence of obtaining the first parsing result and the second parsing result, if the second parsing result is not a predetermined identifier.

According to an embodiment of the present disclosure, the answer information obtaining module is configured to: take the second parsing result as the parsing result if the second parsing result is obtained first; and retrieve the answer information for the question voice information according to the second parsing result and the current work information.

According to an embodiment of the present disclosure, the answer information obtaining module is configured to: take the first parsing result as the parsing result if the first parsing result is obtained first; and use the first parsing result as the answer information.

According to an embodiment of the present disclosure, the parsing result obtaining unit is configured to: take the first parsing result as the parsing result, if the second parsing result is the predetermined identifier.

According to an embodiment of the present disclosure, the apparatus further includes: a display adjusting module, configured to adjust display content according to the answer information.

According to an embodiment of the present disclosure, the step of adjusting display content according to the answer information includes: matching the answer information with art painting information of current display content to obtain a matching result; and adjusting the display content as art painting content corresponding to the answer information if the matching result is that the answer information is inconsistent with the art painting information of the current display content.

According to a third aspect of the present disclosure, there is provided a computer-readable storage medium having a computer program stored thereon, and the computer program, when executed by a processor, implements the voice question-answering method according to any one of the above embodiments.

According to a fourth aspect of the present disclosure, there is provided an electronic device, including: one or more processors; and a storage device for storing one or more programs, which, when executed by the one or more processors, cause the one or more processors to implement the voice question-answering method according to any one of the above embodiments.

It should be noted that the above general description and the following detailed description are merely exemplary and explanatory and should not be construed as limiting of the disclosure.

BRIEF DESCRIPTION OF THE DRAWINGS

Above and other features and advantages of the present disclosure will become more apparent by describing exemplary embodiments thereof in detail with reference to the accompanying drawings.

DETAILED DESCRIPTION

Figure 1:
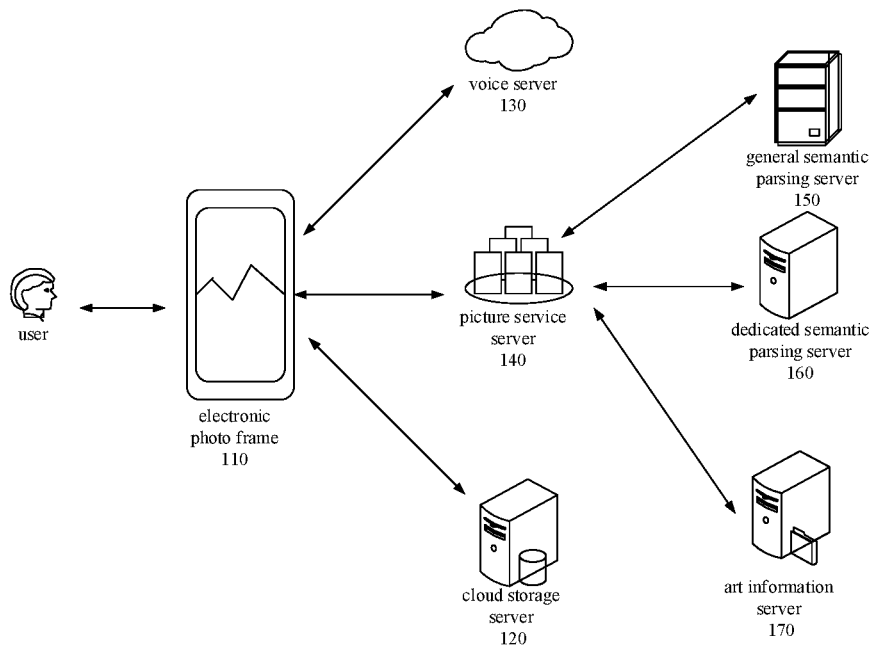
FIG. 1 is a schematic diagram of a voice question-answering system provided by an exemplary embodiment of the present disclosure.

Exemplary embodiments will now be described more fully with reference to the accompanying drawings. However, the exemplary embodiments can be implemented in a variety of forms and should not be construed as being limited to the examples set forth herein; rather, these embodiments are provided so that the present disclosure will be more complete and comprehensive and convey the idea of the exemplary embodiments to those skilled in this art. The same reference numerals in the drawings denote the same or similar parts, and the repeated description thereof will be omitted.

In addition, the features, structures, or characteristics described above may be combined in any suitable manner in one or more embodiments. In the description below, numerous specific details are set forth to provide a thorough understanding of the embodiments of the present disclosure. However, those skilled in the art will appreciate that the technical solution of the present disclosure may be practiced without one or more of the specific details, or other methods, components, apparatuses, steps, and the like may be employed. In other instances, well-known methods, apparatuses, implementations, or operations are not shown or described in detail to avoid obscuring various aspects of the present disclosure.

The block diagrams in the drawings are merely functional entities and do not necessarily correspond to physically independent entities. That is, these functional entities may be implemented in software, or implemented in one or more hardware modules or integrated circuits, or implemented in different networks and/or processor devices and/or microcontroller devices.

The flowcharts shown in the drawings are only an exemplary description, and do not necessarily include all contents and operations/steps, nor does them have to be performed in the described order. For example, some operations/steps can be decomposed, and some operations/steps can be combined or partially combined, so the actual execution order may be changed according to actual conditions.

FIG. 1 is a schematic diagram of a voice question-answering system provided by an exemplary embodiment of the present disclosure.

As shown in FIG. 1, the voice question-answering system 100 provided by embodiments of the present disclosure may include a display terminal (here an electronic photo frame 110 is taken as an example for illustration, but the present disclosure is not limited to this, and the display terminal may be any terminal device having a display function, such as a tablet computer, a smart phone, etc.), a service server (here, a picture service server 140 is taken as an example for illustration), a general semantic parsing server 150 and a dedicated semantic parsing server 160.

The electronic photo frame 110 can be used for displaying a current work. The current work here can be, for example, any world-famous painting, or some new and vigorous works of art, or a work drawn by the user or a photo taken by the user, which is not limited herein.

For example, the work currently displayed by the electronic photo frame 110 being a certain world-famous painting is taken as an example, and a rich world collection of famous paintings can be stored in a cloud storage server 120 in advance, and each famous painting can be numbered, and each painting has a unique identification (ID), which is called a painting ID, and the painting ID and the corresponding painting are stored in the cloud storage server 120 in a one-to-one correspondence. The user can actively send a painting display request to the electronic frame 110. The electronic frame 110 sends the painting display request to the cloud storage server 120. The cloud storage server 120 can return the corresponding painting (for example, "Mona Lisa") to the electronic frame 110 according to the painting display request. The cloud storage server 120 may also actively push the painting to the electronic frame 110 for display, which is not limited in the present disclosure.

It should be noted that although the cloud storage server is used as an example to store paintings, the present disclosure is not limited to this, and any suitable storage device may be used for storing paintings or other work information. In addition, the works displayed on the electronic photo frame 110 are not limited to be extracted from the cloud storage server 120, and also may be pushed from a mobile phone terminal, for example.

In the embodiments of the present disclosure, the general semantic parsing server 150 can be used for performing semantic understanding on questions in general fields, such as a weather field, a chatting field, an audiobook field, a story field, a music field, an encyclopedia field, etc., to identify what is a question intention of the user. The general semantic parsing server 150 may, for example, adopt a Turing robot, but the present disclosure is not limited to this. The dedicated semantic parsing server 160 can be used for performing semantic understanding on questions of an art field, such as paintings, to identify the intention of the question of the user.

With continued reference to FIG. 1, the voice question-answering system 100 may further include a voice server 130, and the voice server 130 may further include a voice recognition server and a voice synthesis server (not shown in the figure). After receiving question voice information sent by the user, the electronic photo frame 110 can send the question voice information to the voice server 130, and the voice server 130 can convert it into question text information and return the question text information to the electronic photo frame 110. When the electronic photo frame 110 receives answer information for the question voice information returned by the picture service server 140, if the answer information includes answer text information, the answer text information can be converted into an answer voice information by the voice synthesis server in the voice server 130, so that the electronic photo frame 110 can play the answer information in a voice form.

In the embodiment of FIG. 1, the voice question-answering system 100 may also include an art information server 170. The art information server 170 may pre-store information about each world famous painting, such as who is an author of each world famous painting, and the author's biography, creation time, creation background, the museum belonged to, where is the exhibition currently, what important historical events have been experienced and other relevant data. Similar to the cloud storage server 120, the art information server 170 can also store the painting ID of each painting and its painting related data in a one-to-one correspondence.

It should be noted that although the electronic photo frame 110, the cloud storage server 120, the voice server 130, the picture service server 140, the general semantic parsing server 150, the dedicated semantic parsing server 160, and the art information server 170 are of independent physical parts in the embodiment of FIG. 1, some or all of them can also be integrated into a same physical device in practice, which is not limited in the present disclosure.

Figure 2:
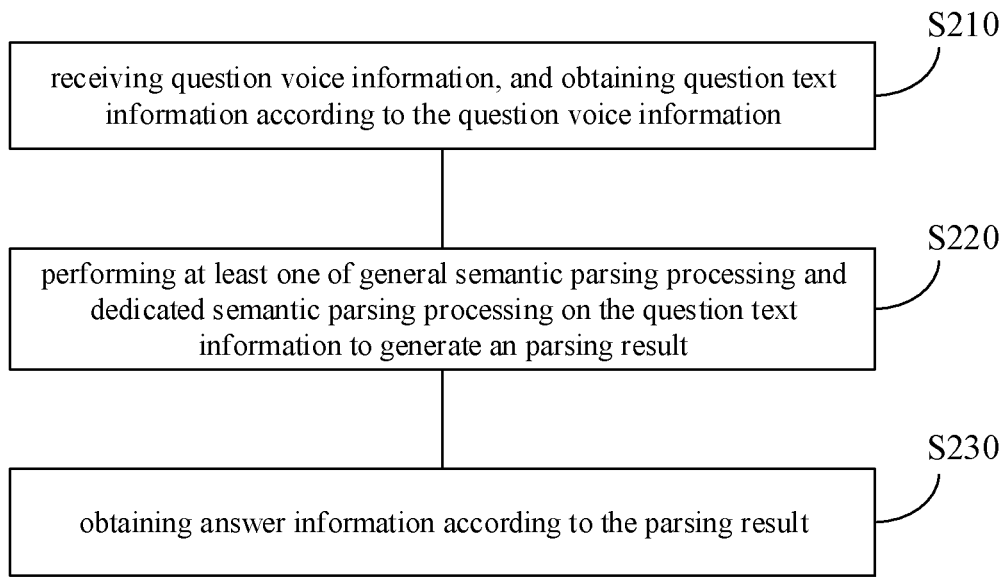
FIG. 2 is a flowchart of a voice question-answering method provided by an exemplary embodiment of the present disclosure.

FIG. 2 is a flowchart of a voice question-answering method provided by an exemplary embodiment of the present disclosure. The method provided by the embodiments of the present disclosure can be executed by any electronic device with computation processing capabilities, for example, any one of the electronic photo frame 110, the cloud storage server 120, the voice server 130, the picture service server 140, the general semantic parsing server 150, the dedicated semantic parsing server 160, and the art information server 170 in the embodiment of FIG. 1, or a combination thereof, and the present disclosure does not limit an execution subject of the method provided in this embodiment.

As shown in FIG. 2, the voice question-answering method provided by the embodiments of the present disclosure may include the following steps.

In step S210, question voice information is received, and question text information is obtained according to the question voice information.

For example, the question voice information sent by the user may be received by the electronic frame 110. For another example, the voice server 130 may be used for converting the question voice information into the question text information and then returning it to the electronic photo frame 110. The electronic photo frame 110 may send the question text information to the picture service server 140. Alternatively, the voice server 130 may directly send the question text information to the picture service server 140.

In step S220, at least one of general semantic parsing processing and dedicated semantic parsing processing is performed on the question text information to generate a parsing result.

The general semantic parsing is used for semantic parsing in a general field, and the dedicated semantic parsing is used for semantic parsing in an art field.

In step S230, answer information is obtained according to the parsing result.

According to the voice question-answering method provided by the embodiments of the present disclosure, after the question voice information sent by the user is received, the question text information of the question voice information can be obtained, and at least one of general semantic parsing processing and dedicated semantic parsing processing is performed on the question text information, so as to obtain the parsing result. Then the answer information for the question voice information can be obtained according to the parsing result. In the embodiment, the general semantic parsing processing is mainly used for the semantic parsing in general fields (for example, weather, chat, music, encyclopedia, etc.), and the dedicated semantic parsing processing is mainly used for the semantic parsing of the art field (for example, painting), so that the question intention contained in the question voice information can be identified according to the results of the general semantic parsing processing and/or the dedicated semantic parsing processing, and then the answer information can be obtained based on the information and fed back to the user. On the one hand, by performing the semantic parsing on the question by adopting at least one of general semantic parsing processing and dedicated semantic parsing processing, not only voice questions in various general fields raised by the user can be answered, but also voice questions in the art field can be answered, thereby realizing a comprehensive voice question-answering function and ensuring the robustness of the apparatus; on the other hand, by adopting the dedicated semantic parsing processing, the problem of insufficient accuracy of semantic parsing for a vertical field of art by the general semantic parsing processing can also be solved, thereby improving the accuracy of voice question-answering, and well meeting the needs of automatic question-answering in a digital art field.

Figure 3:
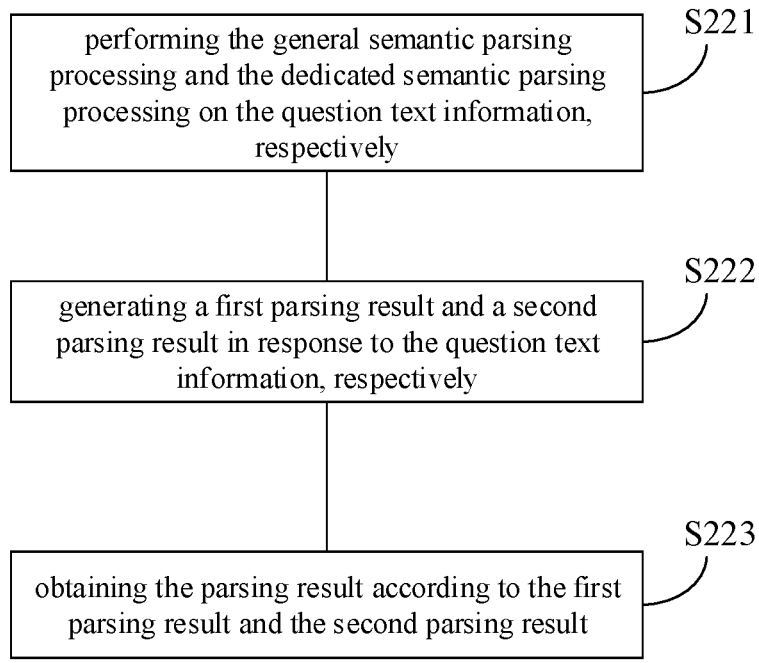
FIG. 3 schematically shows a flowchart of step S220 in FIG. 2 in an embodiment.

FIG. 3 schematically shows a flowchart of step S220 in FIG. 2 in an embodiment.

As shown in FIG. 3, in the embodiment of the present disclosure, the above step S220 may further include the following steps.

In step S221, the general semantic parsing processing and the dedicated semantic parsing processing are performed on the question text information, respectively.

For example, after receiving the question text information, the picture service server 140 may simultaneously send the question text information to the general semantic parsing server 150 for the general semantic parsing processing, and send the question text information to the dedicated semantic parsing server 160 for the dedicated semantic parsing processing.

In step S222, a first parsing result and a second parsing result in response to the question text information are generated, respectively.

For example, the general semantic parsing server 150 performs the general semantic parsing processing on the question text information, generates the first parsing result in response to the question text information, and sends it to the picture service server 140. The dedicated semantic parsing server 160 performs the dedicated semantic parsing processing on the question text information, generates the second parsing result in response to the question text information, and sends it to the picture service server 140.

In step S223, the parsing result is obtained according to the first parsing result and the second parsing result.

For example, the picture service server 140 may make a decision based on the received first parsing result and second parsing result, and generate the parsing result.

Figure 4:
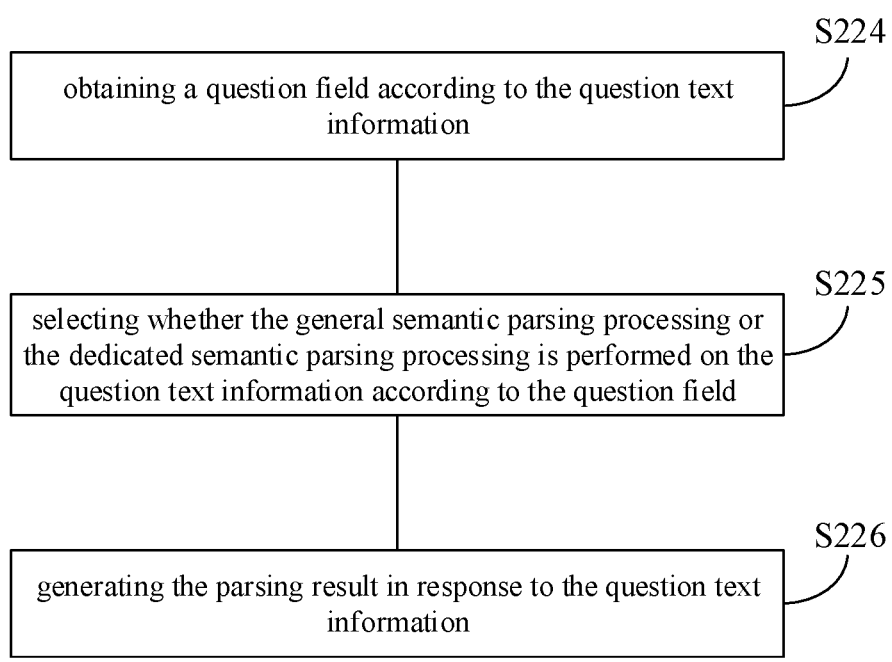
FIG. 4 schematically shows a flowchart of step S220 in FIG. 2 in another embodiment.

FIG. 4 schematically shows a flowchart of step S220 in FIG. 2 in another embodiment.

As shown in FIG. 4, in the embodiments of the present disclosure, the above step S220 may further include the following steps.

In step S224, a question field is obtained according to the question text information.

For example, the picture service server 140 may identify the question field of the question text information in advance, and identify whether the question raised by the question text information belongs to the general field or the art field.

In step S225, the general semantic parsing processing or the dedicated semantic parsing processing is selected to perform on the question text information according to the question field.

For example, if the picture service server 140 identifies that the question field to which the question text information belongs is the general field, it sends the question text information to the general semantic parsing server 150 for the general semantic parsing processing.

For another example, if the picture service server 150 identifies that the question field to which the question text information belongs is the art field, it sends the question text information to the dedicated semantic parsing server 160 for the dedicated semantic parsing processing.

In the embodiments of the present disclosure, the question field of the question text information is determined first, and then the question text information is subjected to the corresponding general semantic parsing processing or dedicated semantic parsing processing according to the determined question field, so that the amount of calculation processing can be reduced, the speed and accuracy of returning the parsing result can be improved.

In step S226, the parsing result is generated in response to the question text information.

For example, if the question field is the general field, the picture service server 140 receives the parsing result returned by the general semantic parsing server 150 in response to the question text information. If the question field is the art field, the picture service server 140 receives the parsing result returned by the dedicated semantic parsing server 160 in response to the question text information.

Figure 5:
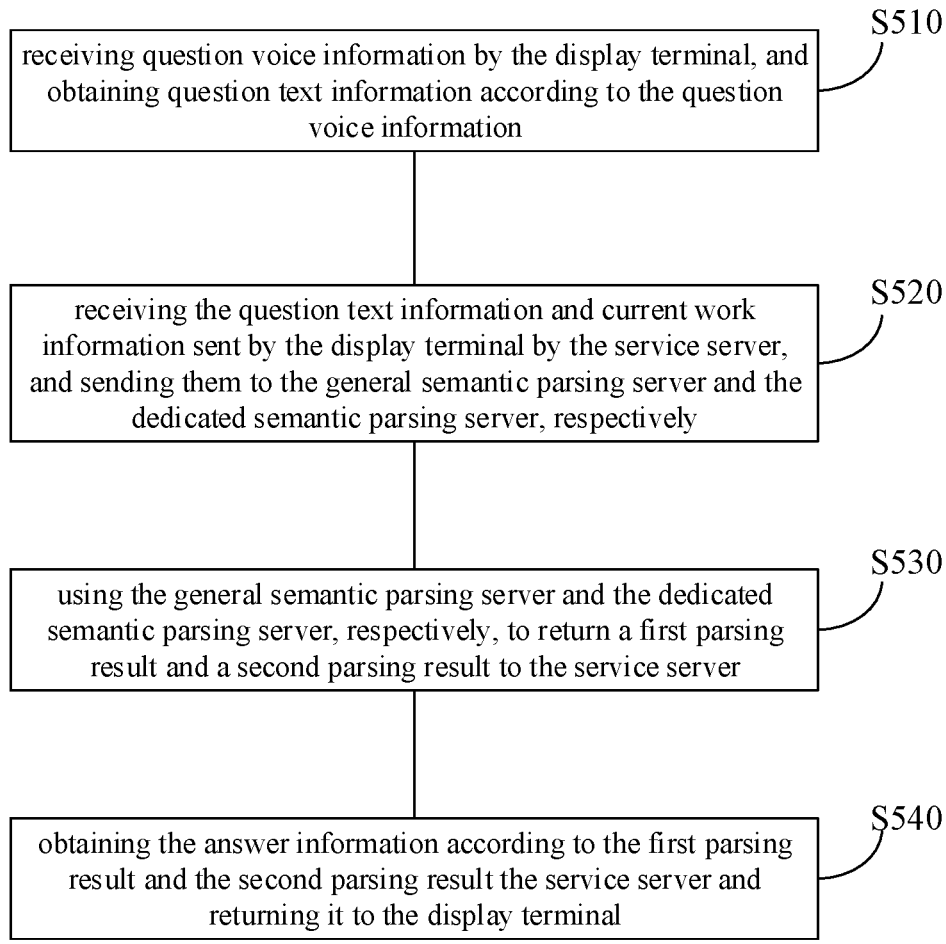
FIG. 5 is a flowchart of another voice question-answering method provided by an exemplary embodiment of the present disclosure.

FIG. 5 is a flowchart of a voice question-answering method provided by an exemplary embodiment of the present disclosure. The voice question-answering method provided by the embodiments of the present disclosure can be applied to the voice question-answering system as shown in FIG. 1.

As shown in FIG. 5, the voice question-answering method provided by the embodiments of the present disclosure may include the following steps.

In step S510, the question voice information is received by the display terminal, and the question text information is obtained according to the question voice information.

In step S520, the question text information and current work information sent by the display terminal are received by the service server, and are sent to the general semantic parsing server and the dedicated semantic parsing server, respectively.

The general semantic parsing server is used for identifying question intentions in the general field, and the dedicated semantic parsing server is used for identifying question intentions in the art field.

In an exemplary embodiment, the general field may include any one or more of the weather field, chat field, audiobook field, story field, music field, encyclopedia field, and the like. The art field is, for example, painting.

In the embodiments of the present disclosure, the current work information may be any relevant information that can uniquely distinguish a currently displayed work from other works, such as, a painting ID, a painting name, or the like.

In the embodiments of the present disclosure, the service server may perform preprocessing operations on the question text information. For example, text correction processing is performed on the question text information. Since certain question text information may not be correctly identified by the voice recognition, great disadvantages may be brought to the subsequent processing without the text correction processing. By correcting the question text information identified by the voice recognition, the input question is made to be correct as much as possible. The service server can analyze and process the input questions from several angles such as voice, font, and semantics, so as to correct the questions.

In step S530, the general semantic parsing server and the dedicated semantic parsing server are respectively used to return a first parsing result and a second parsing result to the service server, and the first parsing result and the second parsing result are respectively generated based on the question text information and the current work information.

In the embodiments of the present disclosure, the general semantic parsing server performs entity recognition on the question text information and the current work information, and then performs field classification according to a result of the entity recognition, for example, judges whether it is a question in the weather field or music field, or the chat field, or the encyclopedia field, or the like. When the question filed is determined, the user's question intention can be further determined based on the result of entity recognition, such as whether the user wants to know the weather in a certain time period in a specific place, or wants to play a certain song, or wants to obtain information about the painting "Mona Lisa", or the like.

In the embodiments of the present disclosure, the dedicated semantic parsing server may first perform the entity recognition on the question text information and the current work information, and identify the named entities in the question and the current work information, where the named entity recognition can pre-configure named entity information in a user dictionary, and then use lexical analysis technologies for entity recognition according to the user dictionary during online recognition. Then, according to the recognition result, the field classification is performed to determine whether the user's current question is related to the art field. If it is not related to the art field, the dedicated semantic parsing server can return a predetermined identifier, such as "−1", as the second parsing result to be returned to the service server; if it is related to the art field, the dedicated semantic parsing server can further perform intent recognition based on the recognition result. In the embodiments of the present disclosure, the dedicated semantic parsing server first classifies the question field according to the recognition result, and if it is determined that the question field is not in the art field, a set predetermined identifier is returned, so that the service server can select the first parsing result of the general semantic parsing server as the target parsing result based on this, which improves the accuracy of the parsing result, improves the speed and efficiency of the service server's decision-making, and helps to return the answer information to the user in real time and accurately.

The field classification here can use rule filtering manners or machine learning manners. For example, some rules can be classified in advance by data mining technologies, and then filtering rules can be obtained by comprehensive analysis. The field classification performed by using the rule filtering manners is effective and high in performance. For another example, it is also possible to label corpus, and use the labeled corpus to train a classifier for field classification. This machine learning manner has a high degree of automation. Then, according to the question raised by the user, the question intention is identified. The intention recognition is essentially a classification problem, and it can also be based on rule templates and machine learning. Recurrent neural network models based on deep learning can be used here, such as any one of LSTM (Long Short-Term Memory), GRU (Gated Recurrent Unit) or a combination thereof, which has a better effect on the classification problem for the short text.

In step S540, the service server obtains the answer information according to the first parsing result and the second parsing result and returns it to the display terminal.

In the embodiments of the present disclosure, after receiving the first parsing result and the second parsing result, the service server may make decision intent selection, and select the first parsing result or the second parsing result as the question intention of the question voice information.

The voice question-answering method provided by the embodiments of the present disclosure can display a current work (such as paintings) on the display terminal (such as the electronic photo frame). After receiving the question voice information sent by the user, the display terminal can obtain the question text information of the question voice information, and can send the question text information and the current work information to the service server (for example, the picture service server). The service server can call the general semantic parsing server and the dedicated semantic parsing at the same time for performing the semantic parsing on the question text information and the current work information, to obtain the first parsing result and the second parsing result respectively. The general semantic parsing server is mainly used for identifying the question intention in the general fields (for example, weather, chat, music, encyclopedia, etc.), the dedicated semantic parsing server is mainly used for identifying the question intention in the art field (for example, painting), so that the service server can identify the entity and intention contained in the question voice information according to the first parsing result and the second parsing result, and then the service server can obtain the answer information based on the information and feed it back to the display terminal. On the one hand, by simultaneously adopting the general semantic parsing server and the dedicated semantic parsing server to perform the semantic parsing on the question, the system can answer voice questions in various general fields raised by the user, and can also answer voice questions in the art field, thereby realizing a comprehensive voice question-answering function for the electronic photo frame and ensuring the robustness of the system; on the other hand, by adopting the dedicated semantic parsing server, the problem of insufficient accuracy of semantic parsing for a vertical field of art by the general semantic parsing server can also be solved, thereby improving the accuracy of voice question-answering, and well meeting the needs of automatic question-answering in a digital art field, and building a voice interaction platform that adapts to the scenes. In addition, the voice question-answering system provided by the embodiments of the present disclosure has high scalability and can flexibly access other voice functions.

Figure 6:
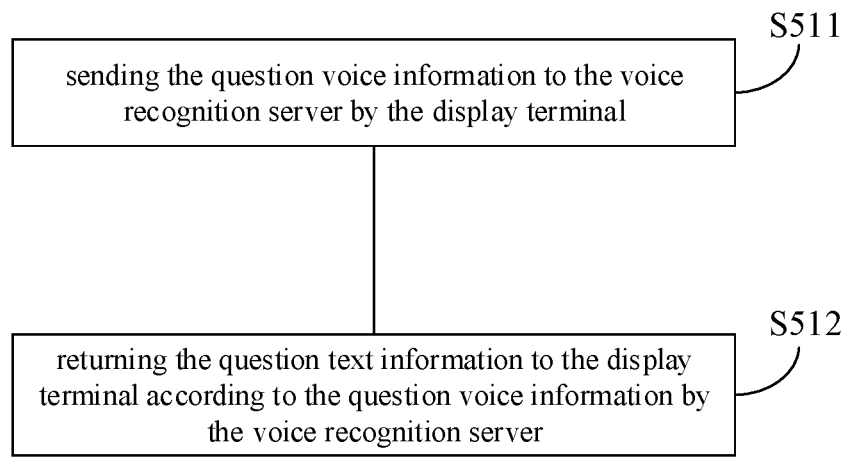
FIG. 6 schematically shows a flowchart of step S510 in FIG. 5 in an embodiment.

FIG. 6 schematically shows a flowchart of step S510 in FIG. 5 in an embodiment. In the embodiments of the present disclosure, the voice question-answering system may further include a voice recognition server.

As shown in FIG. 6, the above step S510 may further include the following steps.

In step S511, the display terminal sends the question voice information to the voice recognition server.

In step S512, the voice recognition server returns the question text information to the display terminal according to the question voice information.

Figure 7:
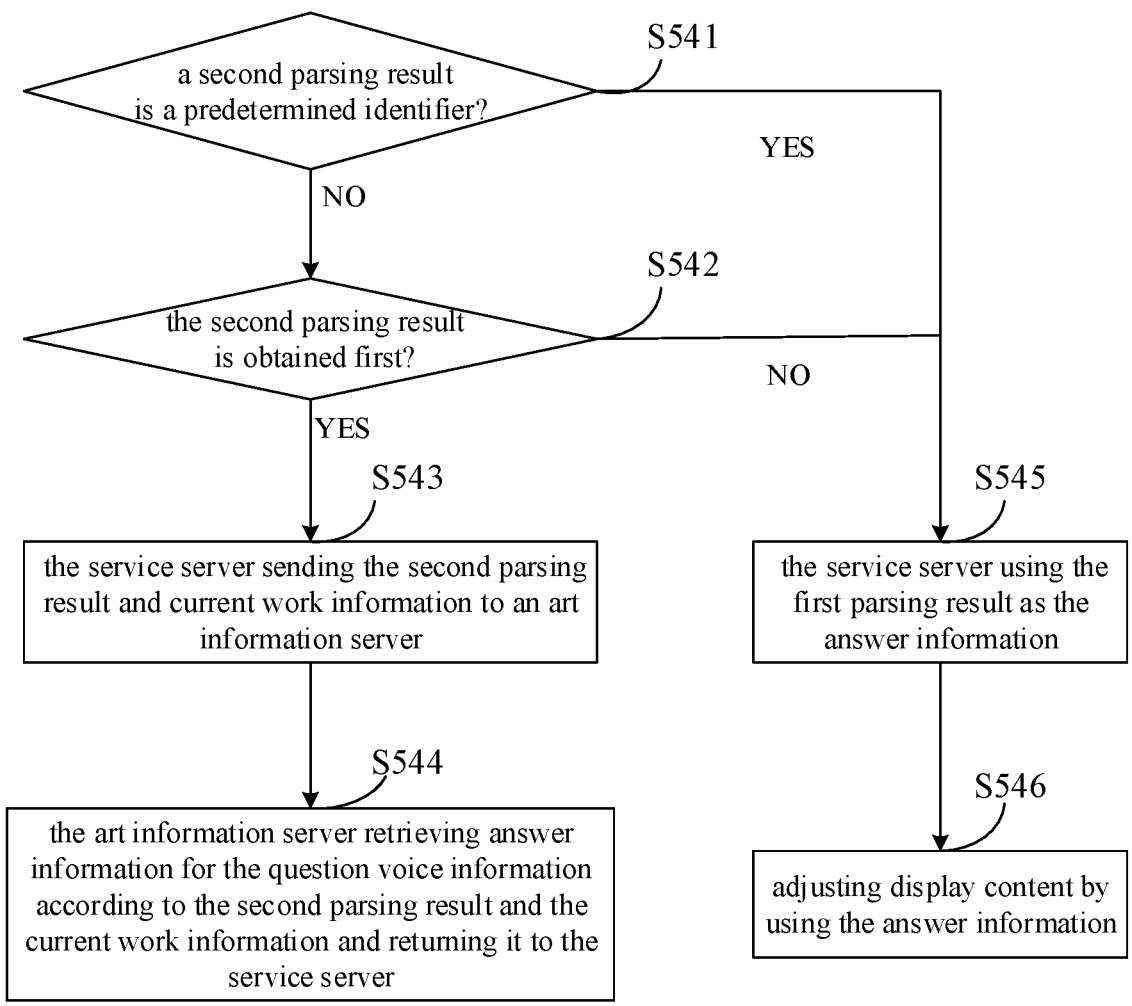
FIG. 7 schematically shows a flowchart of step S540 in FIG. 5 in an embodiment.

FIG. 7 schematically shows a flowchart of step S540 in FIG. 5 in an embodiment.

As shown in FIG. 7, the above step S540 may further include the following steps.

In step S541, the service server determines whether the second parsing result is a predetermined identifier; if so, skip to step S545; if not, proceed to step S542.

For example, the predetermined identifier is "−1".

In step S542, the service server then determines whether the second parsing result is obtained first; if yes, then proceed to step S543; if not, then skip to step S545.

In an exemplary embodiment, if the second parsing result is not the predetermined identifier, the service server determines the target parsing result according to a time sequence of receiving the first parsing result and the second parsing result; and the service server obtains the answer information according to the target parsing result.

In the embodiments of the present disclosure, the service server may determine the target parsing result according to the time sequence of receiving the first parsing result and the second parsing result. For example, if the first parsing result is received first, the first parsing result is used as the target parsing result, which can improve the speed and efficiency of the service server to obtain the target parsing result, which is conducive to real-time return of answer information to the user and improves the user experience.

In step S543, the service server sends the second parsing result and the current work information to an art information server.

In step S544, the art information server retrieves the answer information for the question voice information according to the second parsing result and the current work information and returns it to the service server.

In an exemplary embodiment, the system may further include the art information server for storing art field information. The obtaining the answer information according to the target parsing result by the service server may include: sending, by the service server, the second parsing result and the current work information to the art information server, if the target parsing result is the second parsing result; and retrieving, by the art information server, the answer information for the question voice information according to the second parsing result and the current work information and returning it to the service server.

In the embodiments of the present disclosure, the art information server can retrieve all candidate data that may contain answers from the database according to the painting ID, for example, retrieve all data related to "Mona Lisa", and then perform answer extraction processing. According to the named entity recognition result (included in the second parsing result) obtained by parsing through the dedicated semantic parsing server and the question intention, the entity is used as the intention slot data, and then combined into complete semantic information. According to different application scenarios, and in conjunction with the business requirements of the product, the answer data is extracted from the retrieved data and returned to the service server as the answer information.

For example, each world famous painting and its painting ID are stored in the cloud storage server in advance, and one of the paintings, such as "Mona Lisa", is displayed in the electronic photo frame, and the painting ID is assumed to be 1. If the user sends the voice question "please introduce the current work" to the electronic photo frame, the electronic photo frame sends the question voice to the voice server, and the voice server recognizes the question voice and returns the recognized question text to the electronic photo frame, and then the electronic photo frame sends the question text and the painting ID to the picture service server. The picture service server sends the question text to the general semantic parsing server (here, for example, the name of the painting such as "Mona Lisa" can also be sent to the general semantic parsing server), at the same time the question text and the painting ID are sent to the dedicated semantic parsing server. The general semantic parsing server will parse the question text and obtain the first parsing result. The dedicated semantic parsing server pre-models an LSTM model, which is trained for words in the art field, and is specifically used for parsing the question text in the art field to obtain the second parsing result. The general semantic parsing server returns the first parsing result to the picture service server, and the dedicated semantic parsing server returns the second parsing result to the picture service server. If the picture service server determines that the second parsing result is not "−1", that is, the current question is related to the art field, the picture service server continues to determine which parsing result is returned first. Assuming it is the second parsing result returned to the picture service server first, then the picture service server sends the second parsing result to the art information server. The art information server is equivalent to a database, which records the ID of each painting and its corresponding related information, such as the introduction of the work, the author of the work, or the like. The art information server matches the question according to the painting ID and the second parsing result, retrieves the corresponding answer text and/or answer audio and returns it to the picture service server, and the picture service server returns it to the electronic photo frame. If it is the answer text, the picture service server sends the answer text to the voice server to synthesize the answer voice, and the electronic photo frame will play the answer voice and/or answer audio.

In step S545, the service server uses the first parsing result as the answer information.

In an exemplary embodiment, the obtaining the answer information according to the target parsing result by the service server may include taking the first parsing result as the answer information by the service server if the target parsing result is the first parsing result.

In an exemplary embodiment, the obtaining the answer information according to the first parsing result and the second parsing result by the service server may include: taking the first parsing result as the answer information by the service server, if the second parsing result is the predetermined identifier. In the embodiments of the present disclosure, when the second parsing result returned by the dedicated semantic parsing server is the predetermined identifier, it means that the question raised by the user at present is not related to the art field. At this time, the service server can directly select the first parsing result returned by the general semantic parsing server as the answer information, thus the speed, timeliness and accuracy of returning answer information are improved, the amount of system calculation and processing is reduced, and the user experience can be improved.

For example, if the user sends a voice question "please play a song for me" to the electronic photo frame, the question is not related to the currently displayed painting at this time, the dedicated semantic parsing server will return "4". If the picture service server receives the "−1" returned by the dedicated semantic parsing server, no matter whether the first parsing result comes first or the second parsing result comes first, it will wait for the first parsing result returned by the general semantic parsing server. For example, if the first parsing result includes a link to a song, there is no need to use the art information server at this time, just the link is returned to the electronic photo frame directly.

Continuing to refer to FIG. 7, the method may further include: in step S546, the display content is adjusted by using the answer information.

For example, if the first parsing result includes a link to a song, lyrics of the song can be displayed on the electronic frame, and the song can be played at the same time. For another example, if the user asks, "how is the weather of XX tomorrow?", the weather of XX tomorrow can be broadcast to the user in a voice form, and the weather of XX tomorrow can also be displayed on the electronic frame at the same time.

In an exemplary embodiment, the step of adjusting display content according to the answer information includes: matching the answer information with art painting information of current display content to obtain a matching result; and adjusting the display content as art painting content corresponding to the answer information, if the matching result is that the answer information is inconsistent with the art painting information of the current display content.

Figure 8:
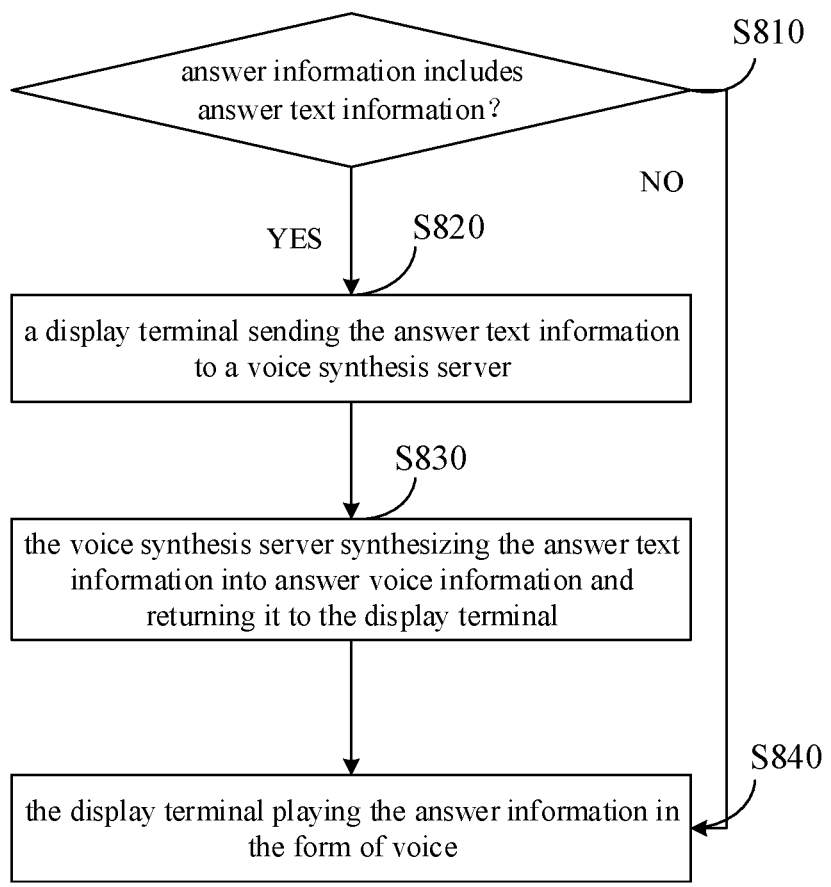
FIG. 8 is a flowchart of yet another voice question-answering method provided by an exemplary embodiment of the present disclosure.

FIG. 8 is a flowchart of another voice question-answering method provided by an exemplary embodiment of the present disclosure. In the embodiments of the present disclosure, the system may further include a voice synthesis server.

As shown in FIG. 8, differences between the voice question-answering method provided by the embodiments of the present disclosure and other embodiments described above are that the following steps may further be included.

In step S810, the display terminal determines whether the received answer information includes answer text information; if so, it proceeds to step S820; if not, it skips to step S840.

In step S820, the display terminal sends the answer text information to the voice synthesis server.

In step S830, the voice synthesis server synthesizes the answer text information into answer voice information and returns it to the display terminal.

In step S840, the display terminal plays the answer information in the form of voice.

Figure 9:
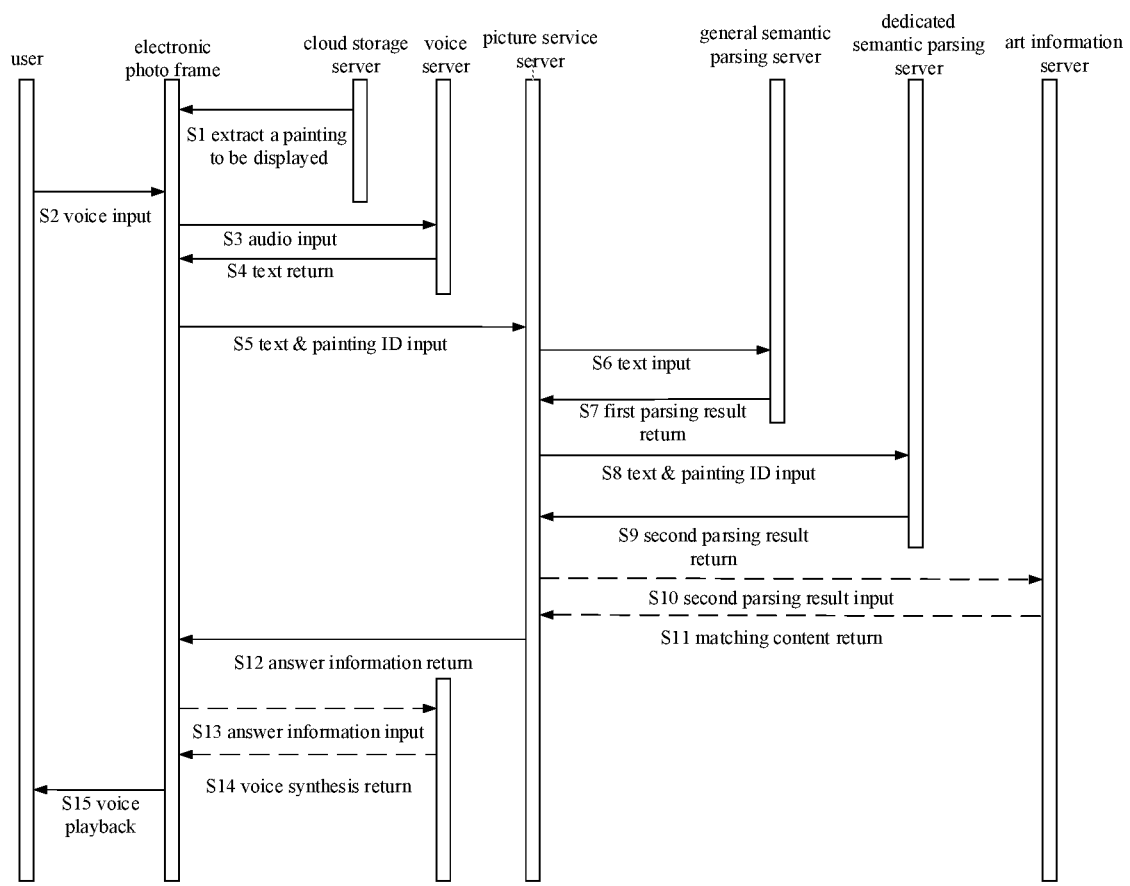
FIG. 9 is a schematic diagram of a voice question-answering method provided by an exemplary embodiment of the present disclosure.

FIG. 9 is a schematic diagram of a voice question-answering method provided by an exemplary embodiment of the present disclosure.

As shown in FIG. 9, the embodiment of the present disclosure takes a picture scene as an example for illustration, and the voice question-answering method may include the following steps.

In step S1, a painting is extracted from the cloud storage server and displayed on the electronic photo frame.

In step S2, the user inputs the question voice into the electronic photo frame.

In step S3, the electronic photo frame inputs audio of the received question voice to the voice server.

In step S4, the voice server performs voice recognition on the received question voice, and returns the question text to the electronic photo frame.

In step S5, the electronic photo frame inputs the question text and the painting ID currently displayed by the electronic photo frame to the picture service server.

In step S6, the picture service server inputs the question text to the general semantic parsing server.

In step S7, the general semantic parsing server generates the first parsing result according to the question text and returns it to the picture service server.

In step S8, the picture service server inputs the question text and the painting ID to the dedicated semantic parsing server.

In step S9, the dedicated semantic parsing server generates the second parsing result according to the question text and the painting ID and returns it to the picture service server.

If the second parsing result is not the predetermined identifier, and the picture service server first receives the second parsing result, the method may further include: in step S10, the picture service server inputs the second parsing result to the art information server, and in step S11, the art information server retrieves matching content according to the second parsing result and returns it to the picture service server.

In step S12, the picture service server obtains the answer information according to the first parsing result and the second parsing result and returns it to the electronic photo frame.

Specifically, if the second parsing result is not the predetermined identifier, and the picture service server first receives the second parsing result, the picture service server uses the matching content returned by the art information server as the answer information; if the second parsing result is the predetermined identifier, or the picture service server receives the first parsing result first, the picture service server uses the first parsing result as the answer information.

In step S13, the electronic photo frame inputs the answer information to the voice server.

In step S14, the voice server performs voice synthesis on the answer information and returns it to the electronic photo frame.

In step S15, the electronic photo frame performs voice playback to the user.

Figure 10:
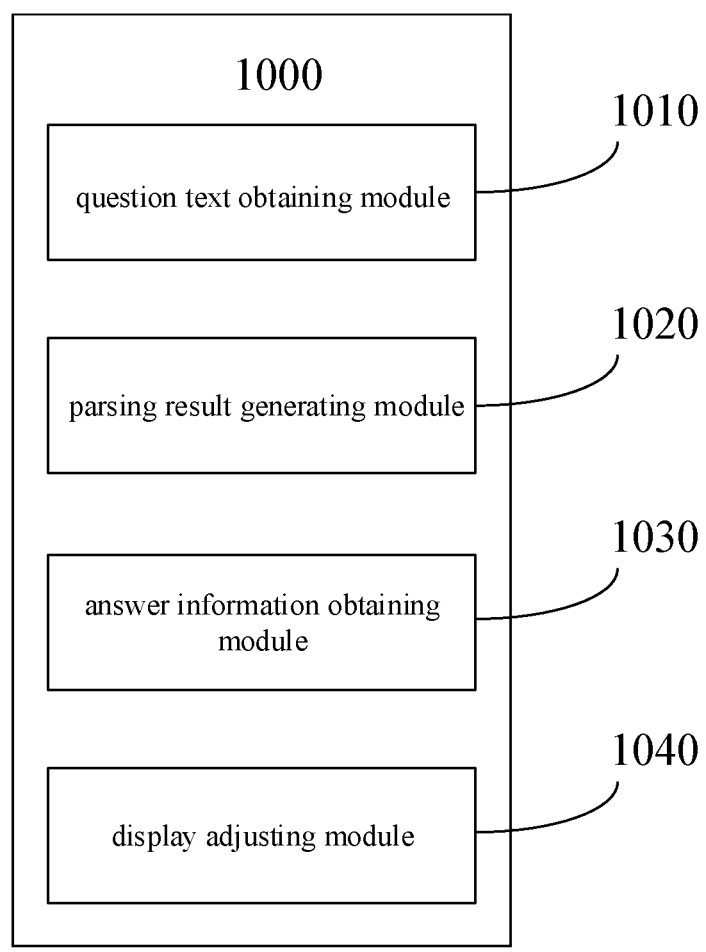
FIG. 10 is a block diagram of a voice question-answering apparatus provided by an exemplary embodiment of the present disclosure.

FIG. 10 is a block diagram of a voice question-answering apparatus provided by an exemplary embodiment of the present disclosure.

As shown in FIG. 10, the voice question-answering apparatus 1000 provided by the embodiments of the present disclosure may include a question text obtaining module 1010, a parsing result generating module 1020, and an answer information obtaining module 1030.

The question text obtaining module 1010 may be configured to receive question voice information and obtain question text information according to the question voice information. The parsing result generating module 1020 may be configured to perform at least one of general semantic parsing processing and dedicated semantic parsing processing on the question text information to generate a parsing result. The answer information obtaining module 1030 may be configured to obtain answer information according to the parsing result. The general semantic parsing is used for semantic parsing in a general field, and the dedicated semantic parsing is used for semantic parsing in an art field.

Figure 10A:
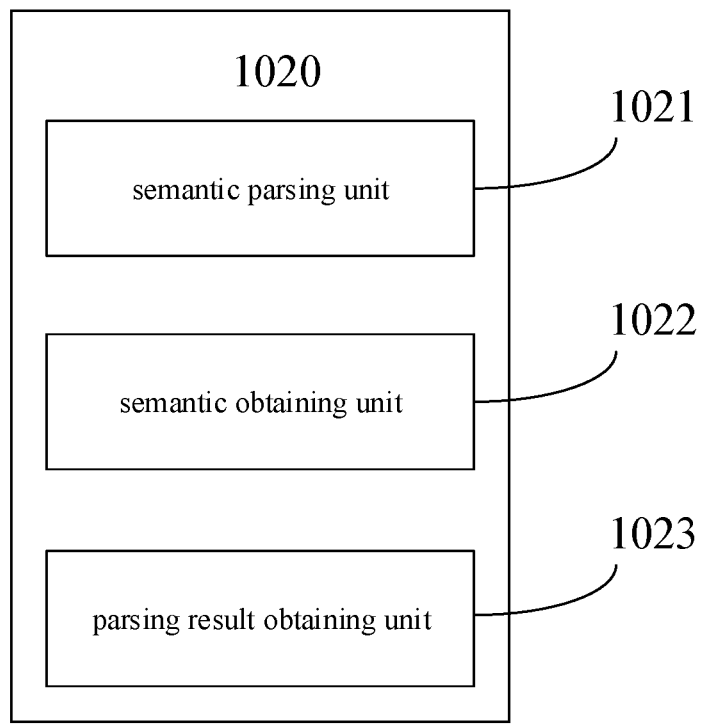
FIG. 10A is a block diagram of a parsing result generating module in a voice question-answering apparatus provided by an exemplary embodiment of the present disclosure.

FIG. 10A is a block diagram of a parsing result generating module in a voice question-answering apparatus provided by an exemplary embodiment of the present disclosure.

As shown in FIG. 10A, in an exemplary embodiment, the parsing result generating module 1020 may include: a semantic parsing unit 1021, which may be configured to perform the general semantic parsing processing and the dedicated semantic parsing processing on the question text information, respectively; a semantic obtaining unit 1022, which may be configured to generate a first parsing result and a second parsing result in response to the question text information, respectively; and a parsing result obtaining unit 1023, which may be configured to obtain the parsing result according to the first parsing result and the second parsing result.

Figure 10B:
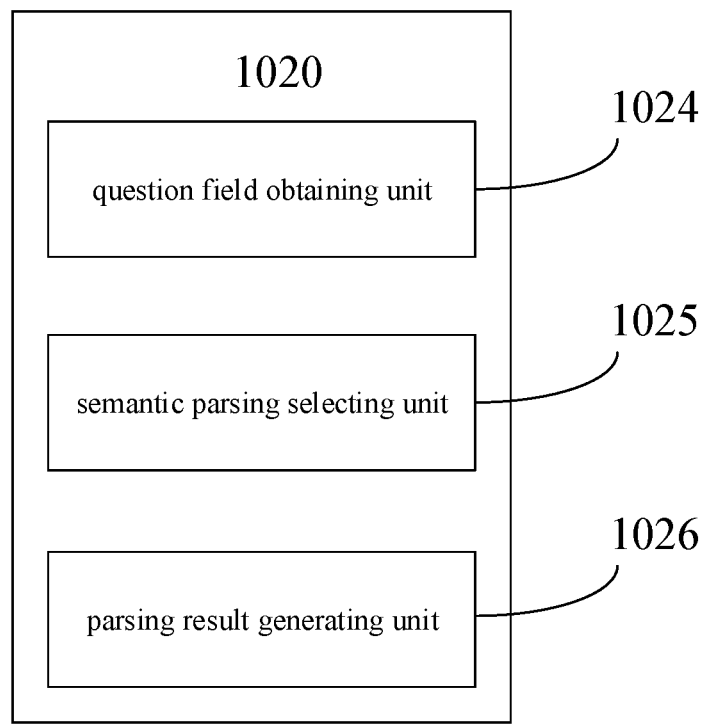
FIG. 10B is a block diagram of a parsing result generating module in another voice question-answering apparatus provided by an exemplary embodiment of the present disclosure.

FIG. 10B is a block diagram of a parsing result generating module in another voice question-answering apparatus provided by an exemplary embodiment of the present disclosure.

As shown in FIG. 10B, in an exemplary embodiment, the parsing result generating module 1020 may include: a question field obtaining unit 1024, which may be configured to obtain a question field according to the question text information; a semantic parsing selecting unit 1025, which may be configured to select to perform the general semantic parsing processing or the dedicated semantic parsing processing on the question text information according to the question field; and a parsing result generating unit 1026, which may be configured to generate the parsing result in response to the question text information.

In an exemplary embodiment, the parsing result obtaining unit may be configured to: determine the parsing result according to a time sequence of obtaining the first parsing result and the second parsing result, if the second parsing result is not a predetermined identifier.

In an exemplary embodiment, the answer information obtaining module 1030 may be configured to: take the second parsing result as the parsing result if the second parsing result is obtained first; and retrieve the answer information for the question voice information according to the second parsing result and the current work information.

In an exemplary embodiment, the answer information obtaining module 1030 may be configured to: take the first parsing result as the parsing result if the first parsing result is obtained first; and use the first parsing result as the answer information.

As shown in FIG. 10, in an exemplary embodiment, the voice question-answering apparatus 1000 may further include: a display adjusting module 1040, configured to adjust display content according to the answer information.

In an exemplary embodiment, the step of adjusting display content according to the answer information includes: matching the answer information with art painting information of current display content to obtain a matching result; and adjusting the display content as art painting content corresponding to the answer information if the matching result is that the answer information is inconsistent with the art painting information of the current display content.

In an exemplary embodiment, the parsing result obtaining unit may be configured to: take the first parsing result as the parsing result, if the second parsing result is a predetermined identifier.

For other content of the voice question-answering apparatus in the embodiments of the present disclosure, reference may be made to the content of the above-mentioned embodiments, which will not be repeated here.

In an exemplary embodiment of the present disclosure, there is also provided an electronic device capable of implementing the above method.

Figure 11:
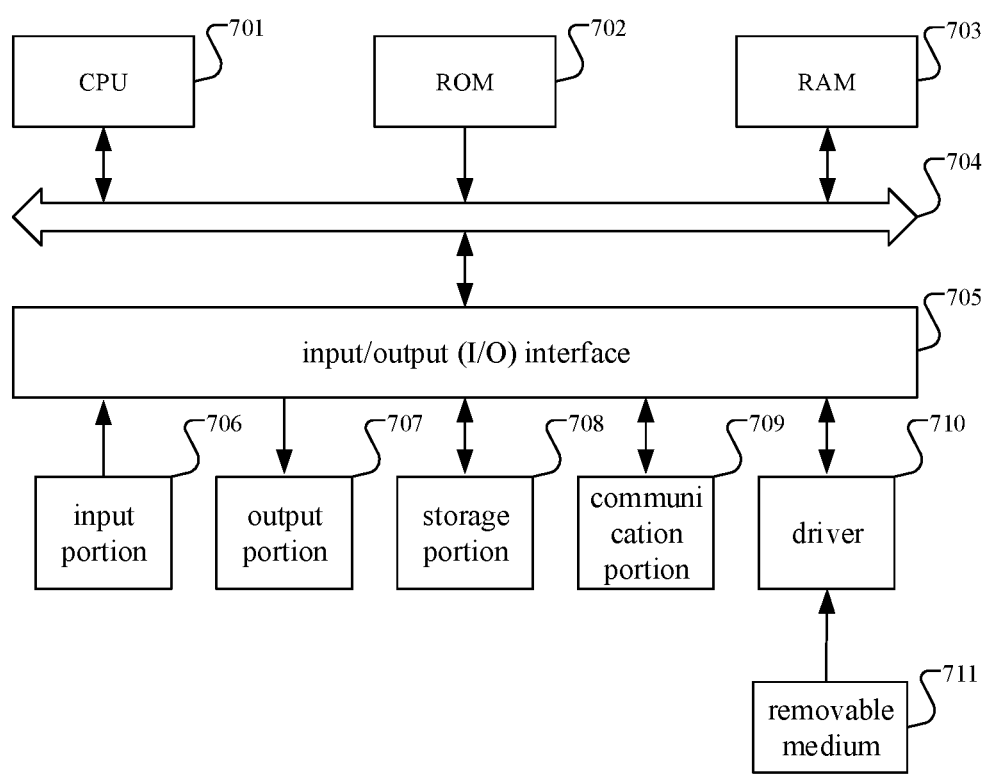
FIG. 11 shows a schematic structural diagram of a computer apparatus suitable for implementing an electronic device of an embodiment of the present disclosure.

Reference is now made to FIG. 11, which shows a schematic structural diagram of a computer apparatus suitable for implementing an electronic device according to an embodiment of the present disclosure. The computer device of the electronic device shown in FIG. 11 is only an example, and should not bring any limitation to the function and scope of use of the embodiment of the present disclosure.

As shown in FIG. 11, the computer device includes a central processing unit (CPU) 701, which can perform various appropriate actions and processing according to programs stored in a read only memory (ROM) 702 or programs loaded from a storage portion 708 to a random access memory (RAM) 703. In the RAM 703, various programs and data necessary for the operations of the apparatus are also stored. The CPU 701, ROM 702 and RAM 703 are connected to each other through a bus 704. An input/output (I/O) interface 705 is also connected to the bus 704.

The following components are connected to the I/O interface 705: an input portion 706 including a keyboard, a mouse, etc.; an output portion 707 including such as a cathode ray tube (CRT), a liquid crystal display (LCD) and a speaker; a storage portion 708 including a hard disk, etc.; and a communication portion 709 including a network interface card such as a LAN card, a modem, or the like. The communication portion 709 performs communication processing via a network such as the Internet. A driver 710 is also connected to the I/O interface 105 as needed. A removable medium 711, such as magnetic disks, optical disks, magneto-optical disks, semiconductor memories, etc., are installed on the driver 710 as needed, so that the computer program read out therefrom is installed into the storage portion 708 as needed.

In particular, according to the embodiments of the present disclosure, the processes described above with reference to the flowcharts can be implemented as a computer software program. For example, an embodiment of the present disclosure includes a computer program product, which includes a computer program carried on a computer-readable storage medium, and the computer program contains program codes for executing the method shown in the foregoing flowcharts. In such an embodiment, the computer program may be downloaded from the network through the communication portion 709 and installed, and/or installed from the removable medium 711. When the computer program is executed by the central processing unit (CPU) 701, the above-mentioned functions defined in the apparatus of the present application are executed.

It should be noted that the computer-readable medium shown in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor device, apparatus, or device, or a combination of any of the above. More specific examples of the computer-readable storage media may include, but not limited to: electrical connections with one or more wires, portable computer disks, hard disks, a random access memory (RAM), a read-only memory (ROM), an erasable programmable read only memory (EPROM or flash memory), an optical fiber, a portable compact disk read only memory (CD-ROM), an optical storage device, a magnetic storage device, or any suitable combination of the above. In the present disclosure, the computer-readable storage medium may be any tangible medium that contains or stores a program, and the program may be used by or in combination with an instruction execution apparatus, an apparatus, or a device. In the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable medium may send, propagate, or transmit the program for use by or in combination with the instruction execution apparatus, apparatus, or device. The program code contained on the computer-readable medium can be transmitted by any suitable medium, including but not limited to, wireless, wire, optical cable, RF, etc., or any suitable combination of the above.

The flowcharts and block diagrams in the drawings illustrate possible implementations of architecture, functions and operations of the apparatus, method, and computer program product according to various embodiments disclosed in the present disclosure. In this regard, each block in the flowchart or block diagram may represent a module, a program segment, or a portion of codes, and the above-mentioned module, program segment, or the portion of codes contains one or more executable instructions for implementing specified logical functions. It should also be noted that, in some alternative implementations, the functions noted in the blocks may occur in an order different from that noted in the drawings. For example, two consecutive blocks can actually be executed in parallel, and sometimes they can also be executed in a reverse order, depending on the functions involved. It should also be noted that each block in the block diagram and/or flowchart, and a combination of blocks in the block diagram and/or flowchart, can be implemented with a dedicated hardware-based device that performs the specified function or operation, or with a combination of a dedicated hardware and computer instructions.

The units or modules involved in the embodiments described in the present disclosure can be implemented in software or hardware. The described unit or module can also be provided in the processor. Names of these modules or units do not constitute a limitation on the module or unit itself under certain circumstances.

As another aspect, the present application also provides a computer-readable storage medium. The computer-readable storage medium may be included in the electronic device described in the above embodiments; or it may exist alone without being assembled into the electronic device. The foregoing computer-readable storage medium carries one or more programs, and when the foregoing one or more programs are executed by an electronic device, the electronic device implements the voice question-answering method described in the foregoing embodiments.

For example, the electronic device may implement that as shown in FIG. 2: in the step S210, question voice information is received and question text information is obtained according to the question voice information; in the step S220, at least one of general semantic parsing processing and dedicated semantic parsing processing is performed on the question text information to generate a parsing result; and in the step S230, answer information is obtained according to the parsing result, wherein the general semantic parsing is used for semantic parsing in a general field, and the dedicated semantic parsing is used for semantic parsing in an art field.

It should be noted that although modules or units of devices or apparatuses for executing actions are described above, such division of modules or units is not mandatory. In fact, features and functions of two or more of the modules or units described above may be embodied in one module or unit in accordance with the embodiments of the present disclosure. Alternatively, the features and functions of one module or unit described above may be further divided into multiple modules or units.

Through the description of the above embodiments, those skilled in the art will readily understand that the exemplary embodiments described herein may be implemented by software or by a combination of software with necessary hardware. Therefore, the technical solutions according to embodiments of the present disclosure may be embodied in the form of a software product, which may be stored in a non-volatile or non-transitory storage medium (which may be a CD-ROM, a USB flash drive, a mobile hard disk, etc.) or on a network. A number of instructions are included to cause a computing device (which may be a personal computer, server, touch terminal, or network device, etc.) to perform the methods in accordance with the embodiments of the present disclosure.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are only illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A voice question-answering method, comprising:
 receiving question voice information, and obtaining question text information according to the question voice information;
 performing general semantic parsing processing and dedicated semantic parsing processing on the question text information to generate a parsing result by:
  performing the general semantic parsing processing on the question text information to generate a first parsing result in response to the question text information;

performing the dedicated semantic parsing processing on the question text information to generate a second parsing result in response to the question text information; and obtaining the parsing result according to the first parsing result and the second parsing result; and obtaining answer information according to the parsing result, wherein the general semantic parsing is used for semantic parsing in a general field, and the dedicated semantic parsing is used for semantic parsing in an art field.

2. The voice question-answering method according to claim 1, wherein performing the general semantic parsing processing and dedicated semantic parsing processing on the question text information to generate the parsing result comprises:

obtaining a question field according to the question text information;

selecting to perform the general semantic parsing processing or the dedicated semantic parsing processing on the question text information according to the question field; and generating the parsing result in response to the question text information.

3. The voice question-answering method according to claim 1, wherein obtaining the parsing result according to the first parsing result and the second parsing result comprises determining the parsing result according to a time sequence of obtaining the first parsing result and the second parsing result when the second parsing result is not a predetermined identifier.

4. The voice question-answering method according to claim 3, wherein obtaining answer information according to the parsing result comprises:

taking the second parsing result as the parsing result when the second parsing result is obtained firstly; and retrieving the answer information for the question voice information according to the second parsing result and current work information.

5. The voice question-answering method according to claim 3, wherein obtaining answer information according to the parsing result comprises:

taking the first parsing result as the parsing result when the first parsing result is obtained firstly; and using the first parsing result as the answer information.

6. The voice question-answering method according to claim 1, wherein obtaining the parsing result according to the first parsing result and the second parsing result comprises taking the first parsing result as the parsing result when the second parsing result is a predetermined identifier.

7. The voice question-answering method according to claim 1, wherein the method further comprises adjusting display content according to the answer information.

8. The voice question-answering method according to claim 7, wherein adjusting the display content according to the answer information comprises:

matching the answer information with art painting information of current display content to obtain a matching result; and adjusting the display content as art painting content corresponding to the answer information when the matching result is that the answer information is inconsistent with the art painting information of the current display content.

9. A voice question-answering apparatus, comprising:
at least one hardware processor; and a storage device storing program instructions thereon that, when executed by the at least one hardware processor, direct the at least one hardware processor to:

receive question voice information;

obtain question text information according to the question voice information;

perform general semantic parsing processing and dedicated semantic parsing processing on the question text information to generate a parsing result;

obtain answer information according to the parsing result, wherein the general semantic parsing is used for semantic parsing in a general field, and the dedicated semantic parsing is used for semantic parsing in an art field;

perform the general semantic parsing processing and the dedicated semantic parsing processing on the question text information, respectively;

respectively generate a first parsing result and a second parsing result in response to the question text information; and obtain the parsing result according to the first parsing result and the second parsing result.

10. The voice question-answering apparatus according to claim 9, wherein the at least one hardware processor is further directed to:

obtain a question field according to the question text information;

select to perform the general semantic parsing processing or the dedicated semantic parsing processing on the question text information according to the question field; and generate the parsing result in response to the question text information.

11. The voice question-answering apparatus according to claim 9, wherein the at least one hardware processor is further directed to determine the parsing result according to a time sequence of obtaining the first parsing result and the second parsing result when the second parsing result is not a predetermined identifier.

12. The voice question-answering apparatus according to claim 11, wherein the at least one hardware processor is further directed to:

take the second parsing result as the parsing result when the second parsing result is obtained firstly; and retrieve the answer information for the question voice information according to the second parsing result and current work information.

13. The voice question-answering apparatus according to claim 11, wherein the at least one hardware processor is further directed to:

take the first parsing result as the parsing result when the first parsing result is obtained firstly; and use the first parsing result as the answer information.

14. The voice question-answering apparatus according to claim 9, wherein the at least one hardware processor is further directed to take the first parsing result as the parsing result when the second parsing result is a predetermined identifier.

15. The voice question-answering apparatus according to claim 9, wherein the at least one hardware processor is further directed to adjust display content according to the answer information.

16. The voice question-answering apparatus according to claim 15, wherein adjusting display content according to the answer information comprises:

matching the answer information with art painting information of current display content to obtain a matching result; and adjusting the display content as art painting content corresponding to the answer information when the matching result is that the answer information is inconsistent with the art painting information of the current display content.

17. A non-transitory computer-readable storage medium having a computer program stored thereon that, when executed by at least one hardware processor, implements a voice question-answering method, comprising:

receiving question voice information and obtaining question text information according to the question voice information;

performing general semantic parsing processing and dedicated semantic parsing processing on the question text information to generate a parsing result by:

performing the general semantic parsing processing on the question text information to generate a first parsing result in response to the question text information;

performing the dedicated semantic parsing processing on the question text information to generate a second parsing result in response to the question text information; and obtaining the parsing result according to the first parsing result and the second parsing result; and obtaining answer information according to the parsing result, wherein the general semantic parsing is used for semantic parsing in a general field, and the dedicated semantic parsing is used for semantic parsing in an art field.

* * * * *